: 2,730,545
Patented Jan. 10, 1956

2,730,545

RECOVERY OF GLUTAMIC ACID

Forest A. Hoglan, Glenview, Ill., assignor to International Minerals & Chemical Corporation, a corporation of New York No Drawing. Application January 28, 1954,
Serial No. 406,887

11 Claims. (Cl. 260—527)

The instant invention relates to processes for the recovery of glutamic acid from liquors from beet sugar molasses from which sugar has been wholly or partially removed. More particularly, it relates to processes for the recovery of glutamic acid from Steffen's filtrates.

Thin Steffen's filtrate is the residual solution which remains after the precipitation of sugar from beet sugar molasses by lime according to the well known Steffen's process. This thin filtrate contains about 97% water, the materials other than water being sodium, calcium, some sugar and other carbohydrates, organic acids, and nitrogenous substances including glutamic acid and varying percentages of potential glutamic acid in the form of pyrrolidone carboxylic acid. The pyrrolidone carboxylic acid is hydrolyzed to obtain glutamic acid, which is recovered from the hydrolysate. Generally, prior to hydrolysis, the Steffen's filtrate is concentrated to obtain concentrated Steffen's filtrate which contains about 60% solids. However, several processes are known in which the thin Steffen's filtrate is hydrolyzed. For example, hydrolysis of thin Steffen's filtrate by the addition of lime and heating is described in U. S. Patent 2,373,342, issued to Royal, and glutamic acid is recovered from the resulting hydrolysate.

By the term "thin Steffen's filtrates" and similar expressions as used herein is meant filtrates taken directly as they are discharged from de-sugarizing processes after removal of lime with carbon dioxide and possessing alkalinity in the form of soluble lime and potassium and sodium hydroxides. Thin Steffen's waste water produced in the Rocky Mountain area possesses a very high alkalinity. After removal of lime by carbon dioxide treatment, it has a pH between about 12.7 and about 13.0. On the other hand, Western Slope thin Steffen's filtrate, produced mainly in California, has a natural alkalinity sufficient to give a pH value of only between about 9.5 and about 10.5 after lime removal by carbon dioxide treatment. The pyrrolidone carboxylic acid present in the filtrate produced in the Rocky Mountain area may be converted to glutamic acid by simply holding the thin filtrate over a prolonged period of time at an elevated temperature without the addition of additional hydrolytic reagents. Such a process is described by Bennett in U. S. Patent 2,535,117. This process involves hydrolyzing the Rocky Mountain thin Steffen's filtrate by storing it at a temperature between about 85° C. and about 90° C. for periods of between about 24 hours and about 48 hours. The hydrolysate is then carbonated to precipitate lime in the form of calcium carbonate which is separated by filtration. The carbonated hydrolysate contains recoverable glutamic acid, and is evaporated, and glutamic acid ultimately separated therefrom at its isoelectric point. This process is not feasible when applied to Western Slope Steffen's filtrates, having a lower alkalinity, because the hydrolysis is incomplete and substantial amounts of glutamic acid precursors initially present in the Steffen's filtrate are lost.

It is an object of the instant invention to provide improved processes for the recovery of glutamic acid from thin liquors from beet sugar molasses from which sugar has been partially or wholly removed.

It is a further object of the instant invention to provide improved processes for the recovery of glutamic acid from raw thin Steffen's filtrates.

It is a further object of the instant invention to provide improved processes for the recovery of glutamic acid from Western Slope Steffen's filtrates possessing a natural alkalinity sufficient to give a pH of between about 9.5 and about 10.5.

It is a further object of the instant invention to provide processes wherein hydrolysis utilizing the inherent alkalinity, particularly of Western Slope thin Steffen's filtrate, is more efficient than in known processes.

These and other objects of the instant invention will become more apparent as hereinafter described.

It has been discovered that liquors from beet sugar molasses from which sugar has been wholly or partially removed, for example thin Steffen's filtrates or similar end liquors from sugar beet refineries, which possess natural alkalinity to give a pH above about 9.5, are substantially completely hydrolyzed by storing for between about 24 hours and about 120 hours at an elevated temperature, followed by concentration of the partially hydrolyzed filtrate prior to any acidification or carbonation of the hydrolysate.

More particularly, raw Steffen's filtrate having an initial temperature between about 55° C. and about 95° C. is allowed to cool gradually, for example in an insulated container for between about 24 hours and about 72 hours. In one embodiment, raw thin Steffen's filtrate directly from the Steffen's desugarizing process and having a temperature between about 85° C. and about 95° C. is employed. At this point, the hydrolysis of the pyrrolidone carboxylic acid in the filtrate is at the most only about 90% complete. The hydrolysate is then directly, without further treatment, concentrated by the removal of water to a dry substance content of between about 55% and about 80%. For example, the hydrolysate is concentrated by heating at a temperature between about 50° C. and about reflux temperature either at atmospheric pressure or under reduced pressure. As the dry substance content of the hydrolysate increases during the concentration, the hydrolysis proceeds to completion. By removal of water to a dry substance content of between about 65% and about 75% the degree of hydrolysis of the glutamic acid precursors approaches 100%. During this concentration, calcium glutamate is formed and precipitates. After the completion of the concentration between about 50% and about 60% of the glutamic acid is crystallizable as the calcium salt. It is thought that as the calcium is precipitated, the equilibrium is shifted, the sodium and potassium present forming their more soluble hydroxides with a resulting increase in alkalinity, which is responsible for causing the hydrolysis to proceed to substantial completion. In other words, sodium and potassium hydroxides are formed in situ as a result of glutamic acid reacting with excess calcium hydroxide present in the thin Steffen's filtrate. This results in the completion of the hydrolysis of pyrrolidone carboxylic acid to glutamic acid. However, the instant invention is not limited by this theory of the reaction. The solid phase calcium glutamate is dissolved when the hydrolysate is subsequently neutralized or by adding water to the hydrolysate. Glutamic acid is recovered from the resulting hydrolysate.

In a specific embodiment of the instant invention, Western Slope Steffen's filtrate as it is taken directly from the Steffen's desugarizing process and having an initial temperature between about 65° C. and about 95° C., preferably a temperature between about 85° C. and about 95° C. is introduced into a suitable storage container. During this transfer the temperature of the filtrate generally decreases by about 5 to 10 degrees. The Steffen's filtrate is preferably retained in storage for a period of approximately 48 hours during which time the temperature decreases to between about 30° C. and about 50° C. Hydrolysis at this point is approximately 90% complete.

The resulting hydrolysate is then concentrated by heating and evaporation, for example, in vacuo, at a temperature between about 50° C. and the reflux temperature, preferably between about 50° C. and about 70° C., to a dry substance content between about 55% and about 80%, preferably to between about 65% and about 75%. The hydrolysis of the pyrrolidone carboxylic acid to glutamic acid is now substantially complete, and glutamic acid can be recovered from the hydrolysate by any of the conventional methods for the recovery of glutamic acid from Steffen's filtrate hydrolysates.

In one embodiment, the hydrolyzed liquor is neutralized or carbonated in order to precipitate impurities, such as calcium, which is removed by neutralizing the hydrolysate with a reagent, such as carbon dioxide, sodium carbonate, sodium bicarbonate, sulfur dioxide, or the like, which form an insoluble calcium salt. The precipitate which forms is separated, for example by filtration. Glutamic acid is crystallized from the filtrate from which impurities have been separated, by concentrating, if necessary, adjusting the pH of said hydrolysate with hydrochloric acid to between about 2.5 and about 3.5, and separating the glutamic acid which crystallizes from the resulting liquor.

In another embodiment of the instant invention, thin Western Slope Steffen's filtrate, directly from the Steffen's desugarizing process having a temperature between about 85° C. and about 95° C., is held for about 48 hours, during which time the temperature gradually decreases to about 50° C. or lower. The Steffen's filtrate is then concentrated, in vacuo, at a temperature between about 50° C. and about 70° C. to between about 65% and about 75% dry substance content. The resulting hydrolysate is neutralized with a reagent which will form an insoluble precipitate with calcium, for example with carbon dioxide, to a pH between about 8.0 and about 9.0 and the calcium carbonate which is precipitated from the hydrolysate is separated, for example by filtration. The pH of the resulting solution is then reduced to between about 4.5 and about 5.5, and is concentrated, if necessary, to a dry substance content of between about 50% and about 85%. Any solids which precipitate from the hydrolysate are separated, for example by filtration. The pH of the resulting liquor is reduced to about 3.2, and the glutamic acid which precipitates from the liquor is separated, for example by filtration.

In another embodiment, glutamic acid is recovered from the Steffen's filtrate hydrolysate by precipitation of calcium glutamate in the presence of methanol as described in co-pending U. S. application, Serial No. 368,846, filed July 1, 1953. The hydrolysate is neutralized, for example to a pH between about 9.0 and about 9.5 with hydrochloric acid, and sufficient methanol is added to the resulting hydrolysate to cause the precipitation of calcium glutamate, which is separated from the liquor, for example by filtration. To produce glutamic acid from the calcium glutamate, it is dissolved in water, the calcium is precipitated from the resulting solution as an insoluble calcium salt, and glutamic acid is crystallized and separated from the solution from which the calcium salt has been separated. For example, the calcium is precipitated by the addition of sulfuric acid, sulfurous acid, or sulfur dioxide to the solution. The insoluble calcium salt is separated, for example by filtration. Glutamic acid is crystallized and separated from the resulting solution after concentration and adjustment of the pH of the solution to between about 3.0 and about 3.3.

The following examples are presented in order to afford a clearer understanding of the practice of the instant invention, but it is understood that they are illustrative only and there is no intention to limit the invention thereto.

*Example I*

Thin Western Slope Steffen's filtrate which contained about 3% dissolved solids was transferred directly from a sugar factory Steffen's House to a retaining tank. The filtrate, when taken from the Steffen's House, was approximately 90° C. and during the transfer, the temperature decreased to about 80° C. The filtrate was stored in the tank for about 48 hours during which period the temperature of the filtrate decreased to about 30° C. At this point it was determined that hydrolysis of the glutamic acid precursors was 89% to 90% complete. About 3,000 pounds of the resulting filtrate, without preliminary neutralization, was concentrated by heating at a temperature between about 60° C. and about 65° C. under a vacuum of about 27 inches mercury to a dry substance content of between about 65% and about 70%. Substantial quantities of solid material precipitated as a result of the concentration. The concentration step required about 12 hours at a temperature between about 50° C. and about 65° C. The resulting slurry contained 6.31% glutamic acid of which approximately 55% was in the solid phase. Hydrolysis was about 98.3% complete. This was determined by diluting two aliquot portions of 4 parts of the concentrated slurry with 10 parts of water and boiling with about 11.4 and about 22.8 parts of 37% hydrochloric acid respectively for about 2.25 hours. The glutamic acid value increased to only about 6.42%.

Calcium was removed from a 500 gram portion of the concentrated Steffen's filtrate hydrolysate which contained about 31.5 grams of glutamic acid, by adding sufficient carbon dioxide to obtain a pH of about 8.5. The calcium carbonate which formed was separated by filtration. The resulting filtrate was adjusted to a pH of between about 5.0 and about 5.5 with hydrochloric acid and was concentrated to about 80% dry substance content. Inorganic salts which formed during the concentration were separated by filtration. The pH of the resulting solution was reduced to about 3.2 with hydrochloric acid, and the glutamic acid which crystallized from the resulting liquor was separated by filtration. The yield of glutamic acid was about 22.7 grams, which is a recovery of about 72%.

*Eample II*

About 100 grams of the Steffen's filtrate hydrolysate, produced as described in Example I, was neutralized to a pH of about 9.2 with hydrochloric acid. About 600 milliliters of methanol were added to the neutralized hydrolysate, and the calcium glutamate which precipitated from the hydrolysate was separated by filtration. The precipitate of calcium glutamate contained about 93% of the total glutamic acid. About 200 milliliters of water were added to dissolve the calcium glutamate, and sufficient sulfuric acid was added to the resulting solution to reduce the pH to about 5.0. Calcium sulfate was separated from the resulting solution by filtration. The filtrate was concentrated to about 80% solids content, and solids were removed by filtration at about 80° C. Hydrochloric acid was added to the filtrate to reduce the pH to about 3.2, and the glutamic acid which crystallized was separated by filtration. The yield of glutamic acid was about 4.92 grams, which was a recovery of glutamic acid of about 78%.

Having thus fully described and illustrated the character of the instant invention, what is desired to be claimed and protected by Letters Patent is:

1. In a process for the recovery of glutamic acid from thin Steffen's filtrate having a pH between about 9.5 and about 10.5, wherein the Steffen's filtrate is partially hydrolyzed by storing at an elevated temperature for at least about 24 hours, the improvements comprising directly concentrating said partially hydrolyzed filtrate to a dry substance content of between about 55% and about 80%, and crystallizing and sepaarting glutamic acid from the resulting hydrolysate.

2. A process for the recovery of glutamic acid from thin Steffen's filtrate having a pH between about 9.5 and about 10.5, which comprises storing said Steffen's filtrate at an initial temperature between about 55° C. and about 95° C. for between about 24 hours and about 120 hours, directly heating and concentrating the partially hydrolyzed filtrate to a dry substance content betwen about 55% and about 80%, and crystallizing and separating glutamic acid from the resulting hydrolysate.

3. In a process for the recovery of glutamic acid from thin Steffen's filtrate having a pH between about 9.5 and about 10.5, wherein the Steffen's filtrate is partially hydrolyzed by storing at an elevated temperature for between about 24 hours and about 120 hours, the improvement comprising directly heating and concentrating said hydrolysate to a dry substance content of between about 65% and about 75%, and crystallizing and separating glutamic acid from the resulting hydrolysate.

4. A process for the recovery of glutamic acid from Western Slope thin Steffen's filtrate which comprises storing said Steffen's filtrate at an initial temperature between about 75° C. and about 95° C. for between about 24 hours and about 72 hours, directly heating and concentrating the partially hydrolyzed filtrate to a dry substance content between about 55% and about 80%, and crystallizing and separating glutamic acid from the resulting hydrolysate.

5. A process for the recovery of glutamic acid from Western Slope thin Steffen's filtrate which comprises storing said filtrate at an initial temperature between about 55° C. and about 95° C. for between about 24 hours and about 48 hours, directly heating to a temperature between about 50° C. and about reflux temperature under vacuum to concentrate the partially hydrolyzed filtrate to a dry substance content of between about 65% and about 75%, and crystallizing and separating glutamic acid from the resulting hydrolysate.

6. A process for the recovery of glutamic acid from raw Steffen's filtrate having a pH between about 9.5 and about 10.5, which comprises storing said Steffen's filtrate at an initial temperature between about 55° C. and about 95° C. for between about 24 hours and about 120 hours, directly heating to a temperature between about 50° C. and about reflux temperature, concentrating the partially hydrolyzed filtrate to a dry substance content between about 55% and about 80%, neutralizing the resulting hydrolysate, adding sufficient methanol to the neutralized hydrolysate to precipitate calcium glutamate, and separating the calcium glutamate from the hydrolysate.

7. A process for the recovery of glutamic acid from raw Steffen's filtrate which comprises storing said Steffen's filtrate having a pH between about 9.5 and about 10.5, at an initial temperature between about 55° C. and about 95° C. for between about 24 hours and about 120 hours, directly heating under vacuum to concentrate the partially hydrolyzed filtrate to a dry substance content between about 55% and about 80%, neutralizing the resulting hydrolysate, adding sufficient methanol to the neutralized hydrolysate to precipitate calcium glutamate, separating the calcium glutamate from the hydrolysate, dissolving the calcium glutamate in water, precipitating calcium for the resulting solution as a water insoluble calcium salt, separating said salt from the solution, and recovering glutamic acid from the resulting solution.

8. A process for the recovery of glutamic acid from Western Slope Steffen's filtrate which comprises storing said Steffen's filtrate at an initial temperature between about 55° C. and about 95° C. for between about 24 hours and about 120 hours, directly heating at a temperature between about 50° C. and about reflux temperature to concentrate the partially hydrolyzed filtrate to a dry substance content between about 55% and about 80%, neutralizing the resulting hydrolysate with an inorganic reagent which forms a water insoluble calcium salt, separating the insoluble calcium salt which precipitates therefrom, and recovering the glutamic acid from the resulting hydrolysate.

9. A process for the recovery of glutamic acid from Western Slope Steffen's filtrate which comprises storing said filtrate at an initial temperature between about 55° C. and about 95° C. for between about 24 hours and about 48 hours, directly heating under vacuum to concentrate the partially hydrolyzed filtrate to a dry substance content of between about 55% and about 80%, neutralizing the resulting hydrolysate with an inorganic reagent which forms a water insoluble calcium salt, separating the insoluble calcium salt which precipitates therefrom, adjusting the pH of the resulting solution to between about 4.5 and about 5.5, concentrating the resulting solution, separating insoluble material from the concentrated solution, reducing the pH of the resulting solution to between about 2.5 and about 3.5, and separating the glutamic acid which crystallizes therefrom.

10. A process for the recovery of glutamic acid from Western Slope Steffen's filtrate which comprises storing said Steffen's filtrate at an initial temperature between about 55° C. and about 95° C. for between about 24 hours and about 48 hours, directly heating at a temperature between about 50° C. and about 70° C. under vacuum to concentrate the partially hydrolyzed filtrate to a dry substance content between about 65% and about 75%, carbonating the resulting hydrolysate, separating insoluble calcium compounds therefrom, reducing the pH of the resulting solution to between about 4.5 and about 5.5, separating inorganic salts which crystallize during the concentration, adjusting the pH of the resulting solution to between about 2.5 and about 3.5, and separating the glutamic acid which crystallizes therefrom.

11. A process for the recovery of glutamic acid from Western Slope Steffen's filtrate which comprises storing said Steffen's filtrate at an initial temperature between about 55° C. and about 95° C. for between about 24 hours and about 48 hours, directly heating to concentrate the partially hydrolyzed filtrate to a dry substance content between about 65% and about 75%, neutralizing the resulting hydrolysate to a pH between about 9.0 and about 9.5, adding sufficient methanol to the neutralized hydrolysate to precipitate calcium glutamate, separating the calcium glutamate from the hydrolysate, dissolving the calcium glutamate in water, precipitating the calcium present as a water insoluble calcium salt, separating said calcium salt from the solution, adjusting the pH of the resulting solution to between about 2.5 and about 3.5, and separating the glutamic acid which crystallizes from the solution.

References Cited in the file of this patent
UNITED STATES PATENTS
2,535,117    Bennett _____ Dec. 26, 1950